Sept. 2, 1958 W. E. CROMWELL 2,850,446
METHODS FOR OZONE GENERATION
Filed Dec. 5, 1956 3 Sheets-Sheet 1
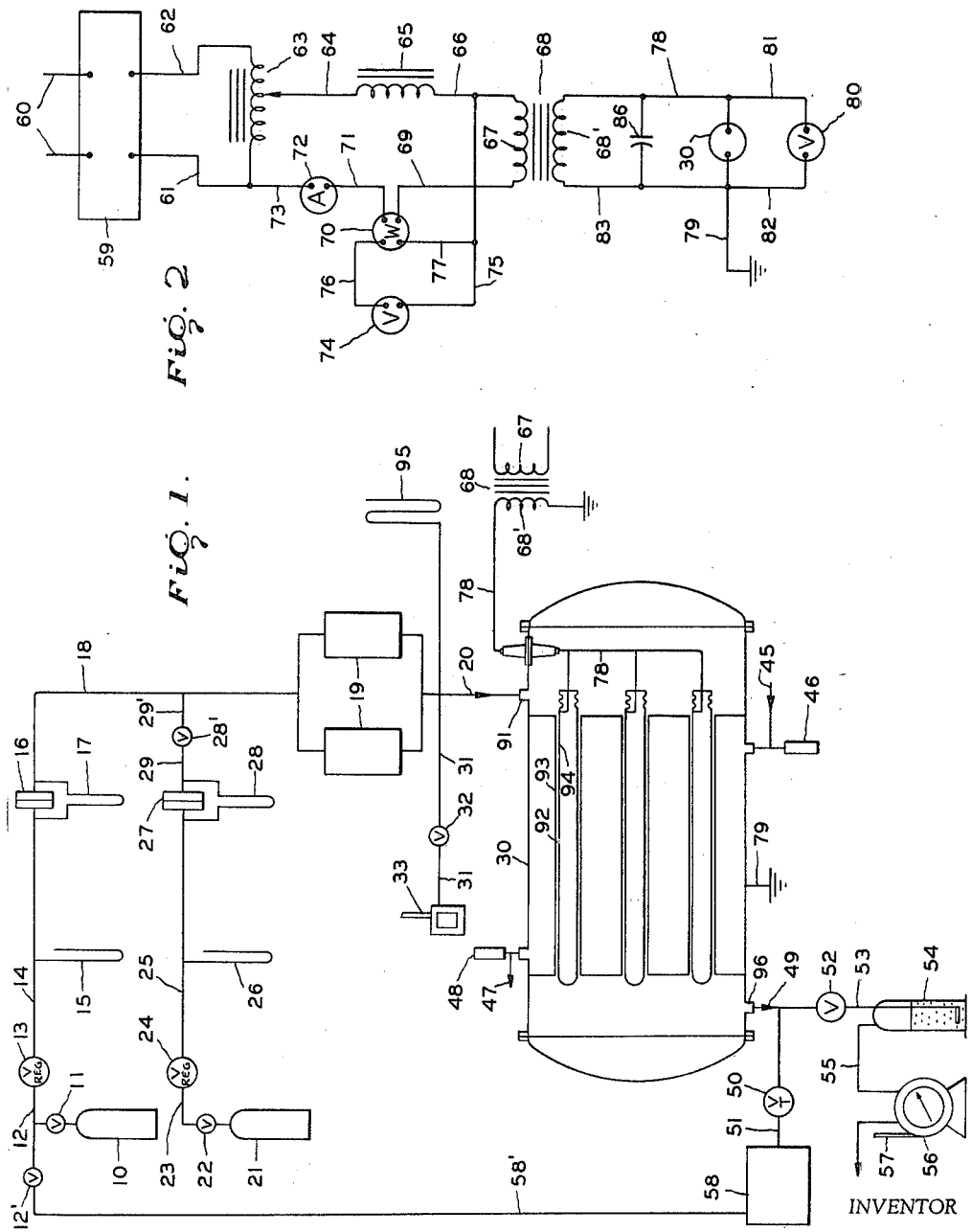
INVENTOR
William E. Cromwell
BY
Cameron, Kerkam & Sutton
ATTORNEYS

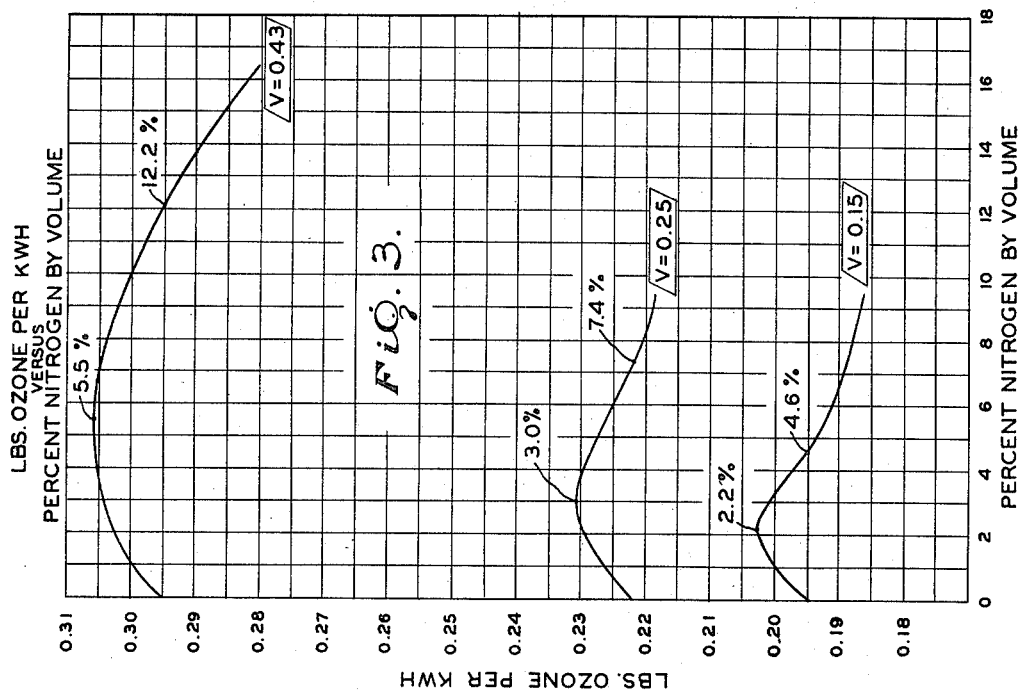
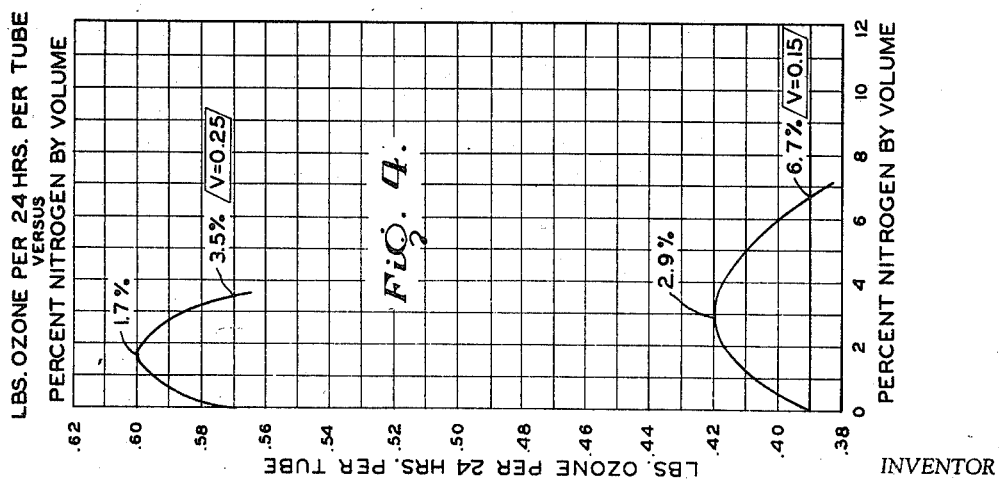

LIMITING VALUE NITROGEN, VOLUME PERCENT
VERSUS
ENERGY INPUT, b, WATT-HRS. PER CU. FT.

2,850,446
METHODS FOR OZONE GENERATION

William E. Cromwell, Titusville, N. J., assignor to The Welsbach Corporation, Philadelphia, Pa., a corporation of Delaware Application December 5, 1956, Serial No. 626,807

7 Claims. (Cl. 204—176)

This invention relates to methods and apparatus for ozone generation and more particularly to such methods and apparatus in which gases heretofore considered as contaminants are employed to increase the efficiency of the apparatus and methods with a resulting increase in the amount of ozone generated per kilowatt-hour of energy supplied or as amounts of ozone produced by the ozone generator per hour.

This application is a continuation-in-part application based upon the application of William E. Cromwell, Serial No. 424,630, filed April 21, 1954, under this same title, now abandoned.

It has heretofore been generally accepted that the best yield of ozone is obtained by generating the ozone from pure oxygen and that any admixture of foreign gases with the pure oxygen impaired the efficiency of the ozone generator and resulted in reduced ozone production. Contrary to this accepted standard and most unexpectedly it has been found that additions of small amounts of nitrogen to the oxygen actually increase the energy yield of ozone generation. This very important and unexpected discovery is the basis of the methods for ozone generation of the present invention and for the apparatus employed for carrying out these methods.

It is accordingly an object of the present invention to provide novel methods and apparatus for ozone generation in which increased efficiency is obtained in the energy yield of ozone with increased production by admixing with the pure oxygen before it is admitted to the ozonator measured small quantities of nitrogen.

Another object is to provide novel methods and apparatus for ozone generation in which increased efficiency is obtained in the energy yield of ozone by regulating the amount of nitrogen present in the oxygen bearing gases before admission to the ozonator.

A further object is to economize on the use of pure oxygen by addition of measured proportions of air thereto.

The methods and apparatus of the present invention are capable of various procedural and mechanical embodiments and the illustrative description thereof hereinafter set forth should in no way be construed as defining or limiting the present invention, reference being had to the appended claims to determine its scope.

The accompanying drawings show illustrative apparatus for carrying out one embodiment of the methods of the present invention and in these drawings, in which like reference characters indicate like parts, Fig. 1 is a schematic representation of suitable apparatus for supplying measured quantities of pure oxygen and measured quantities of nitrogen to an ozonator including apparatus for conveying the ozone bearing mixture to a process in which it is to be used and apparatus for measuring ozone concentration;

Fig. 2 is a circuit diagram of a suitable circuit for supplying electrical energy to the ozonator of Fig. 1;

Fig. 3 is a graphic representation showing increased efficiency of production of ozone compared to volume of nitrogen employed;

Fig. 4 is a graphic representation showing increased production of ozone compared to volume of nitrogen employed.

Figure 5:
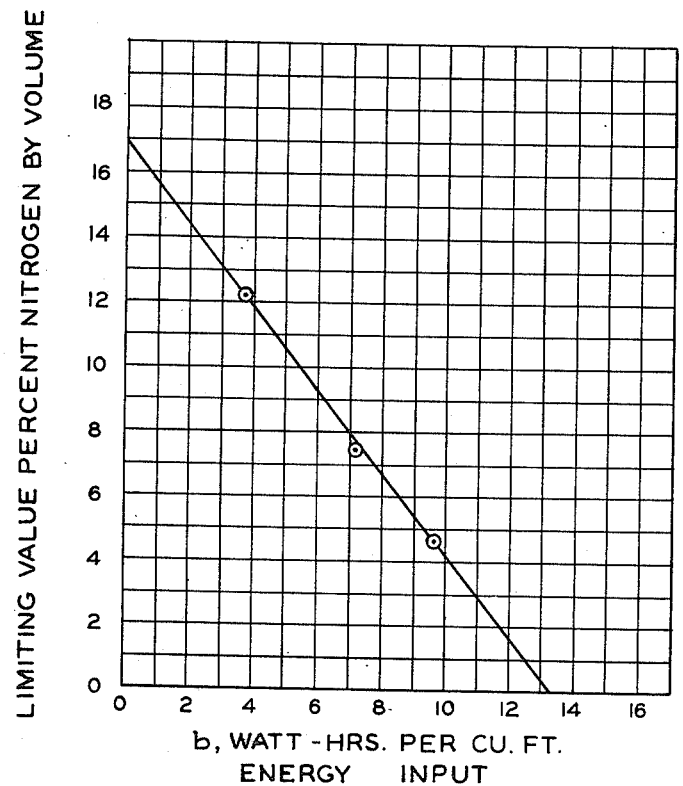
Fig. 5 is a graphic representation showing the limiting value percent of nitrogen by volume as the ordinate and watt-hours per cubic foot energy input as the abscissa.

Referring now more particularly to Fig. 1, it will there be seen that oxygen from any suitable source 10, which may be pure oxygen or an oxygen rich gas mixture derived from a source not primarily utilized for the production of ozone as where oxygen is a byproduct of a chemical reaction, is delivered through a valve 11 to piping 12 which connects through a suitable pressure regulating valve 13 to piping 14 and to a suitable gas volume measuring means 16, and to piping 18 which connects to a suitable dryer 19. Dryer 19 is connected by piping 20 to a suitable ozonator 30. A suitable open end manometer 15 is connected to piping 14, and a suitable differential manometer 17 is connected across the gas volume measuring means 16 into piping 14 and 18 respectively. A suitable dewpoint measuring means 33 is connected to piping 20 by piping 31, through suitable valve 32. A suitable open end manometer 95 is connected to piping 20.

Nitrogen, which may be added as air, is obtained from a suitable source 21, is discharged through a suitable valve 22 which connects through piping 23 to a suitable pressure regulating means 24 which connects by piping 25 to a suitable gas volume measuring means 27. Volume measuring means 27 is connected by piping 29 to a suitable throttle valve 28' which in turn is connected by piping 29' to piping 18.

A suitable open end manometer 26 is connected to piping 25 and a suitable differential manometer 28 is connected across the gas volume measuring means 27 into piping 25 and 29 respectively.

Ozonator 30 is cooled by water from any suitable source admitted thereto through piping 45 and the intake temperature of this water is measured by thermometer 46. Cooling water is discharged from ozonator 30 through piping 47 and the temperature of the discharge cooling water is measured by thermometer 48. Gases, including ozone, leave the ozonator through pipe 49 which connects with a suitable throttle valve 50 to piping 51 which connects to the apparatus in which the ozone is to be used generally indicated at 58. Piping 58' leads from apparatus 58 to piping 12 through valve 12' to recycle the oxygen from which the ozone has been used. A suitable valve 52 connects to piping 49 and connects through piping 53 to a bubbler 54. Bubbler 54 is connected through piping 55 to a suitable wet test meter 56 which is provided with a thermometer 57.

Electric power is provided for ozonator 30 by the electric circuit shown diagrammatically in Fig. 2. In this circuit a suitable constant voltage transformer 59 is supplied with electric energy from any suitable source generally indicated at 60 and connects by wiring 61 and 62 with a variable ratio transformer 63. One side of the variable ratio transformer 63 connects through wiring 64 to a suitable inductor 65 which in turn is connected by wiring 66 with one side of the primary winding 67 of a suitable high voltage transformer 68. Primary winding 67 is connected by wiring 69 to wattmeter 70 which in turn is connected by wiring 71 to a suitable ammeter 72 and to the other side of the variable ratio transformer 63 by wiring 73. A suitable voltmeter 74 is connected by wiring 75 with wiring 66 and across wattmeter 70 by wiring 76 and 77.

The secondary winding 68' of transformer 68 is connected by wiring 78 with ozonator 30 and ozonator 30 is grounded by wiring 79. A suitable electrostatic voltmeter 80 is connected across ozonator 30 by wiring 81 and 82, respectively. The other side of secondary windings 68' of transformer 68 is connected by wiring 83 to wiring 79. A suitable high voltage capacitor 86 is connected across ozonator 30 connecting into wiring 83 and 78 respectively.

Ozonator 30 is of the so called ozonator discharge type and is well known being described in Encyclopedia of Chemical Technology, vol. 9, 1952, pp. 740–747, among others.

Ozonator 30 is made of stainless steel and is so arranged that the gas mixture is admitted at 91 from piping 20 and passes through the space 92 between the jacket 93 and glass dielectric 94 and the ozone and other gases are emitted at 96 into piping 49, as described above. A hollow glass dielectic closed-end tube 94 is internally coated with an electrically conducting material and the above-described electric circuit is connected to said coating through wiring 78. Tube 94 is suitably spaced from jacket 93 to provide a suitable corona discharge space generally indicated at 92. Jacket 93 and ozonator 30 are grounded through wiring 79.

In the tables of data hereinafter the following symbols are employed:

$E_1$ = primary volts
$E_2$ = secondary kilo-volts
$W_2$ = power in watts per tube corrected for meter and transformer losses
$t_w$ = average cooling water temperature in °C.
$V$ = total flow in cubic feet per minute per tube at 760 mm. Hg, 25° C.
$P$ = pressure at ozonator inlet 29 in pounds per square inch (absolute)

When measured amounts of nitrogen are mixed with the oxygen admitted to ozonator 30 or when the nitrogen content of the oxygen rich gases is adjusted before admission to the ozonator a surprising and unexpected increase in efficiency of ozone generation is found when the nitrogen content is maintained from 0.1% to no more than 12.2% of the total volume of the mixed gases. The following tables employing the symbols described above show the increased efficiency of ozone generation when the quantity of nitrogen mixed with the oxygen is controlled before admission to the ozonator in the processes and apparatus described above.

Various theories may be advanced for this surprising and unexpected result but none can be proved and discussion of the same is omitted so as not to burden unduly this specification.

TABLE I

Oxygen and nitrogen mixtures

[V flow per tube, 0.15 S. C. F. M.; $W_2$ power per tube, 87 watts; $t_w$, ° C. 22; $E_1$ volts, 105; $E_2$ kv., 14.7; Pabs., 22.8.]

| Percent by vol. of $N_2$ | Percent by vol. of $O_2$ | Lbs. ozone per kwh. | Lbs. ozone per 24 hrs. per tube |
|---|---|---|---|
| 0 | 100 | .194 | .367 |
| 0 | 100 | .194 | .395 |
| 1.1 | 98.9 | .196 | .412 |
| 2.0 | 98.0 | .202 | .406 |
| 2.2 | 97.8 | .203 | .367 |
| 3.5 | 96.5 | .197 | .416 |
| 4.3 | 95.7 | .196 | .413 |
| 4.4 | 95.6 | .190 | .412 |
| 5.4 | 94.6 | .196 | .404 |
| 6.6 | 93.4 | .190 | .412 |
| 8.6 | 91.4 | .187 | .373 |

TABLE II

Oxygen and nitrogen mixtures

[V flow per tube, 0.25 S. C. F. M.; $W_2$ power per tube, 108 watts; $t_w$, ° C. 26; $E_1$ volts, 112; $E_2$ kv., 15.9; Pabs., 22.8.]

| Percent by vol. of $N_2$ | Percent by vol. of $O_2$ | Lbs. ozone per kwh. | Lbs. ozone per 24 hrs. per tube |
|---|---|---|---|
| 0.2 | 99.8 | 0.224 | 0.579 |
| 0.3 | 99.7 | .220 | .574 |
| 1.7 | 98.3 | .242 | .626 |
| 2.8 | 97.2 | .226 | .581 |
| 3.5 | 96.5 | .231 | .580 |
| 4.9 | 95.1 | .226 | .567 |
| 4.9 | 95.1 | .225 | .555 |

TABLE III

Oxygen and nitrogen mixtures

[V flow per tube, 0.43 S. C. F. M.; $W_2$ power per tube, 98 watts; $t_w$ ° C., 10; $E_1$ volts, 110; $E_2$ kv., 15.7; Pabs., 22.8.]

| Percent by vol. of $N_2$ | Percent by vol. of $O_2$ | Lbs. ozone per kwh. | Lbs. ozone per 24 hrs. per tube |
|---|---|---|---|
| 0 | 100 | 0.296 | 0.715 |
| 7.5 | 92.5 | .305 | .710 |
| 14.6 | 85.4 | .287 | .681 |
| 26.9 | 73.1 | .263 | .586 |

The following table shows the increased efficiency of ozone generation for approximately the same conditions as found in Table III above with as little as 1.1% $N_2$ by volume added to the oxygen.

TABLE IV

Effect of nitrogen in oxygen TX-23

$V$ = 0.41 S. C. F. M.
$t_w$ = 24° C.
$W_2$ = 103 watts

| Trial | Percent $N_2$ by vol. | #/kwh. |
|---|---|---|
| 1 | 0.3 | 0.242 |
| 2 | .3 | .239 |
| 3 | 1.1 | .275 |
| 4 | 1.1 | .277 |

From these tables and Fig. 3 it is apparent that the energy yield (efficiency) of production of ozone increases substantially as nitrogen is present in the oxygen up to 2.2%, at the lowest flow, up to 3.0% at medium flow, and up to 4.5% at the highest flow. It is also apparent that some gain in efficiency as compared to operation with pure $O_2$ can be expected when nitrogen is present in the oxygen up to 4.6%, up to 7.4%, and up to 12.2%, at the three flows indicated. Above these values of nitrogen, the efficiency of production of ozone is less than that with 100% oxygen. By operating in this range of control of nitrogen, a saving in oxygen costs can be realized.

It is also apparent from the tables and Fig. 4 that the total production of ozone as contrasted to the energy yield (efficiency) increases substantially as nitrogen is present in the oxygen up to 1.7% and up to 2.9% for the flows indicated. It is also apparent that some gain in production can be expected up to 3.5% and 6.7%. Above these values of nitrogen, production of ozone is less than that with 100% oxygen.

The advantages of the present invention can also be shown and expressed in terms of a variable "energy input" used with an ozone generator which variable is defined as the ratio between the electric power used and the volume of gas treated. The data given in Tables I, II, III and IV, above, and in the graph of Fig. 3, is sufficient for calculating energy input to show the unexpected change in energy yield of ozone generation when nitrogen is added to the oxygen. This data shows that an optimum energy yield of ozone generation is obtained when a controlled amount of nitrogen is continuously supplied and mixed with the oxygen. The following factors are required to express the present invention in terms of energy input:

$V$ = flow rate of gas in cubic feet per minute.
$W_2$ = electric power in watts (corrected for meter and transformer losses).

The energy input is then determined by:

$$b = W_2 \div 60(V) \text{ watt-hours per cubic foot}$$

From Fig. 3 above it is apparent that there is a limiting value of nitrogen content above which no increase in energy yield can be had. Fig. 3 shows graphically such limiting values for the data of each of Tables I, II and III above.

The following table tabulates the variables energy input and limiting nitrogen value for the data of each of the Tables I, II and III:

TABLE V

| V, cu. ft./min. | $W_2$, watts | b, Watt hrs./cu. ft. | Limiting value, percent nitrogen by vol. |
|---|---|---|---|
| 0.15 | 87 | 9.7 | 4.6 |
| 0.25 | 108 | 7.2 | 7.4 |
| 0.43 | 98 | 3.8 | 12.2 |

The data of Table V is shown graphically in Fig. 5 and it is apparent from this figure that the effect of nitrogen in oxygen for improving energy yields is restricted to a definite range of energy input.

The inventive contribution of the present application can be defined therefore by the critical range of energy input values as a function of energy input and of the upper limit of nitrogen added to the oxygen which will produce an increased energy yield of ozone. The upper limit L of nitrogen to be added to the oxygen for any value of energy input in the range of from 3.8 to 9.7 watt-hours per cubic foot of gas treated is obtained by derivation of a general equation for a straight line from Fig. 5. This has been taken here as:

$$L = 12.2 - 1.27(b - 3.8)$$

where 1.27 = slope of the line as determined by graphical calculation.

As an example, let $b = 6.0$ watt-hours per cubic foot of gas treated then $$L = 12.2 - 1.27(6 - 3.8) = 12.2 - 2.8 = 9.4$$

Graphically from Fig. 5 when $b = 6.0$, $L = 9.35$.

It is therefore apparent that the present invention is operable within the energy input range of from 3.8 to 9.7 watt-hours per cubic foot of gas treated and in a range of nitrogen added of from 1.1% to an upper limit of $L = 12.2 - 1.27(b - 3.8)$.

Commercial oxygen available for use in ozonators contains measurable quantities of nitrogen and in the purest grade usually contains in the neighborhood of 0.3 to 0.5% nitrogen. It is within the concept of this invention to control the amount of nitrogen so provided either by addition thereto or reduction thereof to obtain the above described advantages.

In the generation and use of ozone the gas mixture after passing from the ozonator and after use of the ozone carried therein, may be recycled to the ozonator as through piping 58'. This recycled gas mixture has lost some oxygen and may, and usually does contain contaminants which should be removed and may, and usually will contain quantities of nitrogen. It is therefore within the concept of the present invention to control the nitrogen content of this recycled oxygen within the limits discussed above to obtain the unexpected increase of efficiency and production of the present invention. This control is obtained by removal of nitrogen in excess of these limits or by addition of nitrogen or of oxygen to bring the gas mixture to the desired composition.

It will now be apparent that by the present invention novel methods and apparatus for the generation of ozone employing small amounts of nitrogen with increased efficiency of ozone generation have been provided which in every way satisfy the objects of this invention.

Changes in or modifications to the above described illustrative embodiment of the methods and apparatus of this invention may now be suggested to those skilled in the art without departing from the present inventive concept and reference should be had to the appended claims to determine the scope thereof.

What is claimed is:

1. In a method for increasing the energy yield of ozone in the range of approximately 0.203 to 0.195 lb. of ozone per kwh. by an ozonator supplied with oxygen at a flow rate of approximately 0.15 S. C. F. M., the step of mixing from 1.1% to 4.6% by volume of nitrogen with the oxygen before admission to the ozonator.

2. In a method for increasing the energy yield of ozone in the range of approximately 0.242 to 0.222 lb. of ozone per kwh. by an ozonator supplied with oxygen at a flow rate of approximately 0.25 S. C. F. M., the step of mixing from 1.7% to 7.4% by volume of nitrogen with the oxygen before admission to the ozonator.

3. In a method for increasing the energy yield of ozone in the range of approximately 0.305 to 0.295 lb. of ozone per kwh. by an ozonator supplied with oxygen at a flow rate of approximately 0.43 S. C. F. M., the step of mixing from 1.1% to 12.2% by volume of nitrogen with the oxygen before admission to the ozonator.

4. In a process for increasing the energy yield of ozone generation by an ozonator continuously supplied with electric power and oxygen where the energy input $b$ falls within the range of 3.8 to 9.7 watt-hours per cubic foot of gas treated, the step of mixing with the oxygen before admission to the ozonator an amount of nitrogen in volume percent of from approximately 1.1 to $12.2 - 1.27(b - 3.8)$.

5. In a process for increasing the energy yield of ozone generation by an ozonator continuously supplied with electric power and oxygen where the energy input is approximately 3.8 watt-hours per cubic foot of gas treated, the step of mixing with the oxygen before admission to the ozonator an amount of nitrogen in volume percent of from 1.1 to 12.2.

6. In a process for increasing the energy yield of ozone generation by an ozonator continuously supplied with electric power and oxygen where the energy input is approximately 7.2 watt-hours per cubic foot of gas treated, the step of mixing with the oxygen before admission to the ozonator an amount of nitrogen in volume percent of from 1.7 to 7.4.

7. In a process for increasing the energy yield of ozone generation by an ozonator continuously supplied with electric power and oxygen where the energy input is approximately 9.7 watt-hours per cubic foot of gas treated, the step of mixing with the oxygen before admission to the ozonator an amount of nitrogen in volume percent of from 1.1 to 4.6.

References Cited in the file of this patent

Journal de Chemie Physique, vol. 24 (1927), pp. 370-390.